US012023786B2

(12) United States Patent
Kukucka et al.

(10) Patent No.: US 12,023,786 B2
(45) Date of Patent: Jul. 2, 2024

(54) MULTI-DIRECTIONAL DRIVER BIT

(71) Applicant: GRIP HOLDINGS LLC, Brandon, FL (US)

(72) Inventors: Paul Kukucka, Brandon, FL (US); Thomas Stefan Kukucka, Brandon, FL (US)

(73) Assignee: GRIP HOLDINGS LLC, Brandon, FL (US)

( * ) Notice: Subject to any disclaimer, the term of this patent is extended or adjusted under 35 U.S.C. 154(b) by 0 days.

(21) Appl. No.: 17/752,682

(22) Filed: May 24, 2022

(65) Prior Publication Data

US 2022/0281085 A1 Sep. 8, 2022

Related U.S. Application Data

(63) Continuation-in-part of application No. 16/592,018, filed on Oct. 3, 2019, now Pat. No. 11,364,602, which is a continuation-in-part of application No. 16/107,842, filed on Aug. 21, 2018, now Pat. No. 10,780,556, which is a continuation-in-part of (Continued)

(51) Int. Cl.
*B25B 23/10* (2006.01)
*B25B 15/00* (2006.01)
*B25B 23/00* (2006.01)

(52) U.S. Cl.
CPC .......... *B25B 23/105* (2013.01); *B25B 15/004* (2013.01); *B25B 23/0035* (2013.01)

(58) Field of Classification Search
None
See application file for complete search history.

(56) References Cited

U.S. PATENT DOCUMENTS 1,798,944 A * 3/1931 Jackman ................ B25B 27/18
81/53.2
2,121,197 A * 6/1938 Jackman ................ B25B 27/18
81/53.2

(Continued)

FOREIGN PATENT DOCUMENTS

AU 201612229 4/2016
AU 201612720 6/2016

(Continued)

*Primary Examiner* — Bryan R Muller
*Assistant Examiner* — Dana Lee Poon

(57) ABSTRACT

A screw bit body allowing for torque force application onto a socket fastener. The screw bit body includes a plurality of laterally-bracing sidewalls, a plurality of intermittent sidewalls, a first base, and a second base. The laterally-bracing sidewalls and plurality of intermittent sidewalls are radially distributed about a rotation axis of the screw bit body with each further including a first lateral edge, a second lateral edge, a bracing surface, and an engagement cavity. The engagement cavity creates a gripping point to prevent slippage in between the screw bit body and the socket fastener. The engagement cavity traverses normal and into the concave surface and the convex surface. The engagement cavity includes an angled driving portion and a concave portion. The angled driving portion is positioned adjacent to the first lateral edge with the concave portion being positioned opposite to the first lateral edge, across the angled driving portion.

10 Claims, 13 Drawing Sheets

Related U.S. Application Data application No. 15/601,864, filed on May 22, 2017, now abandoned, said application No. 16/592,018 is a continuation-in-part of application No. PCT/IB2018/050948, filed on Feb. 15, 2018.

(60) Provisional application No. 62/459,374, filed on Feb. 15, 2017.

(56) References Cited

U.S. PATENT DOCUMENTS 2,969,250 A * 1/1961 Kull ...................... B25B 13/065 81/460
3,405,377 A 10/1968 Pierce
3,495,485 A 2/1970 Knudsen et al.
3,902,384 A 9/1975 Ehrler
3,908,489 A 9/1975 Yamamoto et al.
4,074,597 A 2/1978 Jasson
4,536,115 A 8/1985 Helderman
4,598,616 A 7/1986 Colvin
4,607,547 A 8/1986 Martus
4,893,530 A 1/1990 Warheit
4,927,020 A 5/1990 Randy
4,930,378 A 6/1990 Colvin
5,019,080 A 5/1991 Hemer
5,219,392 A 6/1993 Ruzicka et al.
5,228,570 A 7/1993 Robinson
5,251,521 A 10/1993 Burda et al.
5,398,823 A 3/1995 Anders
5,481,948 A 1/1996 Zerkovitz
5,501,342 A 3/1996 Geibel
5,519,929 A 5/1996 Bleckman
5,577,871 A * 11/1996 Brugola ................ F16B 23/003 411/404
5,645,177 A 7/1997 Lin
5,669,516 A 9/1997 Horn
5,725,107 A 3/1998 Dembicks
5,737,981 A 4/1998 Hildebrand
5,743,394 A 4/1998 Martin
5,782,148 A 7/1998 Kerkhoven
5,829,327 A 11/1998 Stanton
5,832,792 A 11/1998 Hsieh
5,873,290 A * 2/1999 Chaconas ............. B25B 15/005 81/436
6,009,778 A 1/2000 Hsieh
6,016,727 A * 1/2000 Morgan ................ B25B 15/008 81/436
6,079,299 A 6/2000 Sundstrom
6,092,279 A 7/2000 Shoup
6,352,011 B1 3/2002 Fruhm
6,431,373 B1 8/2002 Blick
6,575,057 B1 6/2003 Ploeger
6,698,316 B1 3/2004 Wright
6,755,098 B2 6/2004 Huang
6,761,089 B2 * 7/2004 Bergamo ................ B25B 27/18 81/53.2
6,857,340 B2 2/2005 Wagner
6,951,156 B2 10/2005 Garg
7,000,501 B1 2/2006 Chen
D524,615 S 7/2006 Albertson
7,225,710 B2 6/2007 Pacheco
7,331,260 B2 2/2008 Cheng
7,434,494 B1 10/2008 Snider
7,717,278 B2 1/2010 Kao
D614,931 S 5/2010 Su
7,788,994 B2 9/2010 Wright et al.
7,841,480 B2 11/2010 Hsieh
7,913,593 B2 3/2011 Dahar et al.
8,166,851 B2 5/2012 Pchola
8,302,255 B2 11/2012 Lin
8,336,709 B1 12/2012 Geibel
8,448,547 B2 * 5/2013 Whitehead ............. B25B 27/18 81/53.2
D745,814 S 12/2015 Hsieh
D776,505 S 1/2017 Doroslovac
D784,106 S 4/2017 Doroslovac
9,687,968 B2 6/2017 Doroslovac et al.
D794,405 S 8/2017 Doroslovac et al.
9,718,170 B2 8/2017 Eggert
D798,682 S 10/2017 Doroslovac et al.
9,873,195 B1 1/2018 Buxton
9,878,441 B1 1/2018 Kao
D829,069 S 9/2018 Doroslovac et al.
10,081,094 B2 9/2018 Doroslovac et al.
10,328,554 B2 6/2019 Todd
D859,944 S 9/2019 Kukucka et al.
D859,945 S 9/2019 Kukucka et al.
D859,946 S 9/2019 Kukucka et al.
D859,947 S 9/2019 Kukucka et al.
D867,841 S 11/2019 Kukucka et al.
D868,553 S 12/2019 Kukucka et al.
10,493,519 B2 12/2019 Ross
D879,577 S 3/2020 Kukucka et al.
D880,968 S 4/2020 Kukucka et al.
D880,977 S 4/2020 Kukucka et al.
D885,149 S 5/2020 Kukucka et al.
D887,233 S 6/2020 Kukucka et al.
D887,711 S 6/2020 Kukucka et al.
D889,224 S 7/2020 Kukucka et al.
D889,257 S 7/2020 Kukucka et al.
D892,578 S 8/2020 Kukucka et al.
10,780,556 B2 9/2020 Kukucka et al.
10,786,890 B2 9/2020 Kukucka et al.
D899,091 S 10/2020 Kukucka et al.
10,828,766 B2 11/2020 Kukucka et al.
D904,152 S 12/2020 Kukucka et al.
D906,781 S 1/2021 Kukucka et al.
10,882,162 B2 1/2021 Doroslovac et al.
D909,842 S 2/2021 Kukucka et al.
D910,490 S 2/2021 Lim et al.
10,919,133 B2 2/2021 Kukucka et al.
10,967,488 B2 4/2021 Kukucka et al.
11,413,729 B2 * 8/2022 Van Essen ............ B25B 15/005
2003/0209111 A1 11/2003 Huang
2004/0256263 A1 12/2004 Shih
2005/0098459 A1 5/2005 Gorman
2005/0103664 A1 5/2005 Shih
2005/0257357 A1 11/2005 Huang
2005/0274233 A1 12/2005 Lin
2006/0130618 A1 6/2006 Hsieh
2006/0156869 A1 7/2006 Hsieh
2006/0266168 A1 * 11/2006 Pacheco, Jr. .......... B25B 13/065 81/460
2007/0261519 A1 11/2007 Cheng
2008/0235930 A1 10/2008 English
2009/0007732 A1 1/2009 Hsieh
2009/0120885 A1 5/2009 Kao
2009/0220321 A1 9/2009 Sakamura
2011/0056339 A1 3/2011 Su
2011/0303052 A1 12/2011 Chen
2012/0060656 A1 3/2012 Chang
2012/0096992 A1 * 4/2012 Huang .................... B25B 27/18 81/121.1
2012/0132039 A1 5/2012 Su
2012/0210826 A1 8/2012 Stawarski
2013/0047798 A1 2/2013 Huang
2013/0195581 A1 * 8/2013 Unseld .................... F16B 37/00 470/25
2014/0260832 A1 9/2014 Hsiao
2014/0311302 A1 10/2014 Taguchi et al.
2014/0331826 A1 11/2014 Campbell
2014/0360321 A1 12/2014 Steinweg et al.
2015/0135910 A1 5/2015 Eggert et al.
2015/0266169 A1 9/2015 Campbell, II
2015/0314429 A1 11/2015 Doroslovac
2015/0321332 A1 11/2015 Lee
2016/0067853 A1 3/2016 Neto
2016/0136792 A1 * 5/2016 Harp ................... B25B 23/0035 81/436
2016/0223005 A1 8/2016 Rathmann
2016/0271764 A1 9/2016 Huang
2016/0339564 A1 11/2016 Chen
2017/0028538 A1 2/2017 Lourenco et al.
2017/0246733 A1 8/2017 Shehab

(56) References Cited

U.S. PATENT DOCUMENTS

| | | | |
|---|---|---|---|
| 2017/0252905 | A1 | 9/2017 | Doroslovac |
| 2017/0282337 | A1 | 10/2017 | Johnson et al. |
| 2017/0312839 | A1 | 11/2017 | Moss et al. |
| 2017/0312897 | A1 | 11/2017 | Doroslovac |
| 2018/0003241 | A1 | 1/2018 | Goss |
| 2018/0141192 | A1 | 5/2018 | Chang |
| 2018/0354022 | A1 | 12/2018 | Ross et al. |
| 2018/0354102 | A1 | 12/2018 | Kukucka et al. |
| 2019/0001469 | A1 | 1/2019 | Cho et al. |
| 2019/0015961 | A1 | 1/2019 | Kukucka et al. |
| 2019/0152033 | A1 | 5/2019 | Kukucka et al. |
| 2019/0283233 | A1 | 9/2019 | Kukucka et al. |
| 2019/0337131 | A1 | 11/2019 | Kukucka et al. |
| 2019/0375077 | A1 | 12/2019 | Kukucka et al. |
| 2020/0070321 | A1 | 3/2020 | Schulz |
| 2020/0078908 | A1 | 3/2020 | Wu et al. |
| 2020/0269398 | A1 | 8/2020 | Donovan |
| 2020/0298380 | A1 | 9/2020 | Doroslovac et al. |
| 2020/0376648 | A1 | 12/2020 | Kukucka et al. |
| 2020/0391360 | A1 | 12/2020 | Kukucka et al. |
| 2021/0039245 | A1 | 2/2021 | Kukucka et al. |

FOREIGN PATENT DOCUMENTS

| | | | | | |
|---|---|---|---|---|---|
| AU | 201612721 | | | 6/2016 | |
| CA | 2564093 | A1 | | 4/2007 | |
| CA | 168071 | | | 12/2016 | |
| CA | 2898480 | A1 | | 7/2017 | |
| CN | 2767068 | Y | | 3/2006 | |
| CN | 3630254 | | | 6/2006 | |
| CN | 201046555 | Y | | 4/2008 | |
| CN | 101208181 | A | | 6/2008 | |
| CN | 102395447 | | | 3/2012 | |
| CN | 102554833 | A | | 7/2012 | |
| CN | 204186727 | U | | 3/2015 | |
| CN | 303924849 | | | 11/2016 | |
| CN | 303956827 | | | 12/2016 | |
| CN | 303984883 | | | 12/2016 | |
| DE | 3911409 | A1 | | 10/1990 | |
| DE | 9403220 | U1 | | 4/1994 | |
| DE | 4321325 | A1 | | 1/1995 | |
| DE | 29613327 | U1 | | 9/1996 | |
| DE | 10321284 | A1 | | 12/2004 | |
| DE | 202010006146 | U1 | | 7/2010 | |
| DE | 102012104298 | A1 | | 11/2013 | |
| DE | 102013021238 | A1 | | 6/2015 | |
| EP | 0930132 | A2 | | 7/1999 | |
| EP | 0930132 | A3 | | 11/2000 | |
| EP | 1371453 | A2 | | 12/2003 | |
| EP | 1731774 | A1 | | 12/2006 | |
| EP | 1731774 | A1 | | 12/2006 | |
| EP | 0930132 | B1 | | 4/2007 | |
| EP | 2363245 | A2 | | 9/2011 | |
| EP | 2363245 | A3 | | 7/2015 | |
| GB | 906839 | A | | 9/1962 | |
| GB | 1294764 | A | | 11/1972 | |
| GB | 2366532 | A | | 3/2002 | |
| JP | 2011143522 | | | 7/2011 | |
| JP | 2012157913 | | | 10/2011 | |
| JP | 2017042898 | A | | 3/2017 | |
| JP | 2015180835 | A | | 7/2017 | |
| KR | 200149097 | Y1 | | 7/1999 | |
| RU | 2152870 | C1 | | 7/2000 | |
| RU | 2225786 | C2 | | 1/2001 | |
| RU | 45671 | U1 | | 5/2005 | |
| RU | 58510 | U1 | | 11/2006 | |
| RU | 2387533 | C1 | | 4/2010 | |
| RU | 116398 | | | 5/2012 | |
| RU | 180548 | U1 | | 6/2018 | |
| SU | 16616 | A1 | | 8/1930 | |
| TW | 201813785 | A | | 4/2018 | |
| TW | 201829135 | A | | 8/2018 | |
| WO | 9416862 | A | | 8/1994 | |
| WO | 1994016862 | A1 | | 8/1994 | |
| WO | 1996010932 | A1 | | 4/1996 | |
| WO | 1996026870 | A1 | | 9/1996 | |
| WO | 1996027745 | A1 | | 9/1996 | |
| WO | 1997010926 | A1 | | 3/1997 | |
| WO | 1998012982 | A1 | | 4/1998 | |
| WO | WO9812982 | A1 | | 4/1998 | |
| WO | 999032264 | | | 7/1999 | |
| WO | 1999032264 | A1 | | 7/1999 | |
| WO | 2001066312 | A1 | | 9/2001 | |
| WO | 2004002687 | A1 | | 1/2004 | |
| WO | 2005070621 | | | 8/2005 | |
| WO | 2006023374 | | | 3/2006 | |
| WO | 2006130490 | A | | 12/2006 | |
| WO | 2006130490 | A1 | | 12/2006 | |
| WO | 2010007402 | A1 | | 1/2010 | |
| WO | 2011109040 | A1 | | 9/2011 | |
| WO | 2013028875 | A1 | | 2/2013 | |
| WO | WO-2014099954 | A1 | * | 6/2014 | ......... A61B 17/8615 |
| WO | 2015013246 | A | | 1/2015 | |
| WO | WO2015050942 | A1 | | 4/2015 | |
| WO | 2015082283 | A1 | | 6/2015 | |
| WO | 2015050942 | A1 | | 9/2015 | |
| WO | 2016005180 | A | | 1/2016 | |
| WO | 2016051080 | A1 | | 4/2016 | |
| WO | DM/090809 | | | 4/2016 | |
| WO | DM/091188 | | | 5/2016 | |
| WO | DM/091189 | | | 5/2016 | |
| WO | 2016174615 | A1 | | 11/2016 | |
| WO | WO2017069953 | A1 | | 4/2017 | |
| WO | 2017178997 | | | 10/2017 | |
| WO | 2017187388 | A1 | | 11/2017 | |
| WO | 2018150360 | A1 | | 8/2018 | |
| WO | 2018172831 | | | 9/2018 | |
| WO | 2019012486 | | | 1/2019 | |
| WO | 2019167032 | | | 9/2019 | |
| WO | 2019175652 | | | 9/2019 | |
| WO | 2020039281 | | | 2/2020 | |
| WO | 2020039285 | | | 2/2020 | |
| WO | 2020058777 | | | 3/2020 | |
| WO | 2020152516 | | | 7/2020 | |
| WO | 2020208608 | | | 10/2020 | |
| WO | 2020225800 | | | 11/2020 | |
| WO | 2021001696 | | | 1/2021 | |
| WO | 2021019500 | | | 2/2021 | |
| WO | 2021033152 | | | 2/2021 | |

* cited by examiner

MULTI-DIRECTIONAL DRIVER BIT

FIELD OF THE INVENTION

The present invention generally relates to various tools designed for tightening or loosening fasteners, in particular bolts and nuts. More specifically, the present invention is an anti-slip multidirectional driver bit, designed to prevent damaging or stripping fasteners during the extraction or tightening process.

BACKGROUND OF THE INVENTION

Hex bolts, nuts, screws, and other similar threaded devices are used to secure and hold multiple components together by being engaged to a complimentary thread, known as a female thread. The general structure of these types of fasteners is a cylindrical shaft with an external thread and a head at one end of the shaft. The external thread engages a complimentary female thread tapped into a hole or a nut and secures the fastener in place, fastening the associated components together. The head receives an external torque force and is the means by which the fastener is turned, or driven, into the female threading. The head is shaped specifically to allow an external tool like a wrench to apply a torque to the fastener in order to rotate the fastener and engage the complimentary female threading to a certain degree. This type of fastener is simple, extremely effective, cheap, and highly popular in modern construction.

One of the most common problems in using these types of fasteners, whether male or female, is the tool slipping in the head portion, or slipping on the head portion. This is generally caused by either a worn fastener or tool, corrosion, overtightening, or damage to the head portion of the fastener. The present invention is a driving bit design that virtually eliminates slippage. The design uses a series of segmented portions that bite into the head of the fastener and allow for efficient torque transfer between the driving bit and the head portion of the fastener. The present invention eliminates the need for the common bolt extractors as they require unnecessary drilling and tools. With the development of electric screwdrivers, and drills, people have been using, power tools to apply the required torsional forces and remove various fasteners. The present invention provides a double-sided driver end bit, thus allowing for torque to applied to the fastener in both clockwise and counterclockwise directions, thus tightening or loosening the fastener. Most driver end bits have a standardized one fourth inch hex holder and come in various configurations including but not limited to, square end, hex end, or star end.

DETAIL DESCRIPTIONS OF THE INVENTION

All illustrations of the drawings are for the purpose of describing selected versions of the present invention and are not intended to limit the scope of the present invention.

The present invention generally related to torque tool accessories. More specifically, the present invention is a multi-grip socket bit, also known as a screw bit or driver. The present invention allows for a higher torque to be applied to a socket fastener than a similarly sized conventional driver bit without damaging the head of the socket fastener or the bit tool. This is achieved through the use of a multitude of engagement features which effectively grip the head of the socket fastener. The present invention is a socket bit that is compatible with a variety of torque tools including, but not limited to, traditional drills, bit-receiving screwdrivers, socket wrenches, and socket drivers.

Figure 2:
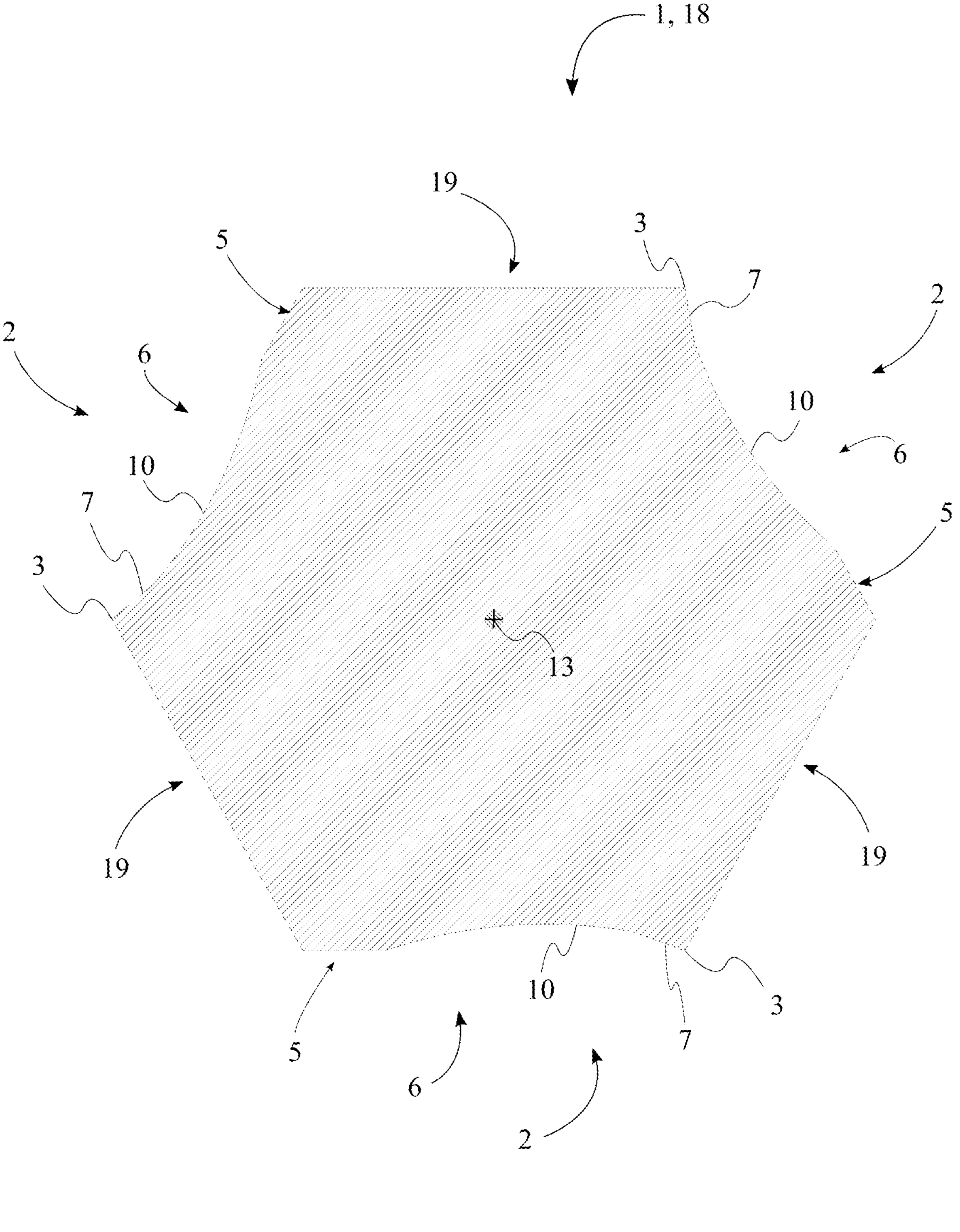
FIG. 2 is a cross-sectional view of the invention as presented in FIG. 1.

In one embodiment, referring to FIG. 2, the present invention comprises an at least one screw bit body 1. The screw bit body 1 is a shank which engages the socket fastener, such as a socket screw or a socket bolt, in order to apply a torque force onto the socket faster. The screw bit body 1 comprises a plurality of laterally-bracing sidewalls 2, a first base 11, and a second base 12. In general, the screw bit body 1 is a prism composed of a strong metal. Each of the plurality of laterally-bracing sidewalls 2 engage within and grip the socket fastener in order to efficiently transfer torque from a torque tool to the socket fastener. The first base 11 and the second base 12 are positioned opposite to each other along the plurality of laterally-bracing sidewalls 2. Additionally, the first base 11 and the second base 12 are each a flat surface that are oriented perpendicular to each of the plurality of laterally-bracing sidewalls 2, thus enclosing/completing the prism shape of the screw bit body 1.

Figure 1:
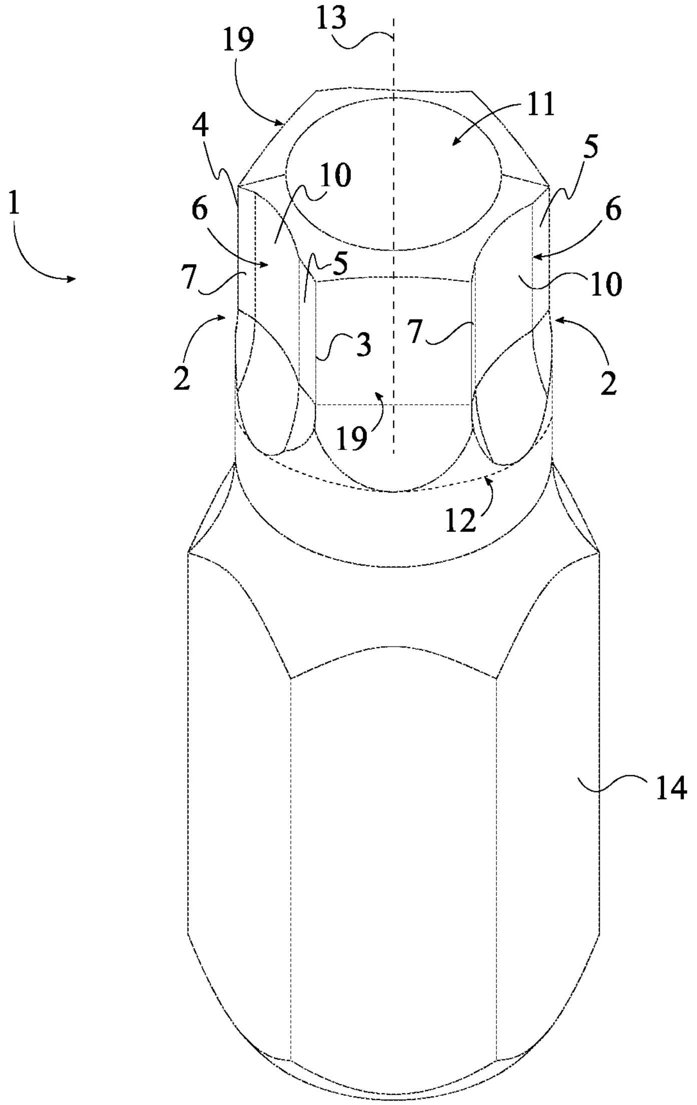
FIG. 1 is a perspective view of the present invention.
Figure 3:
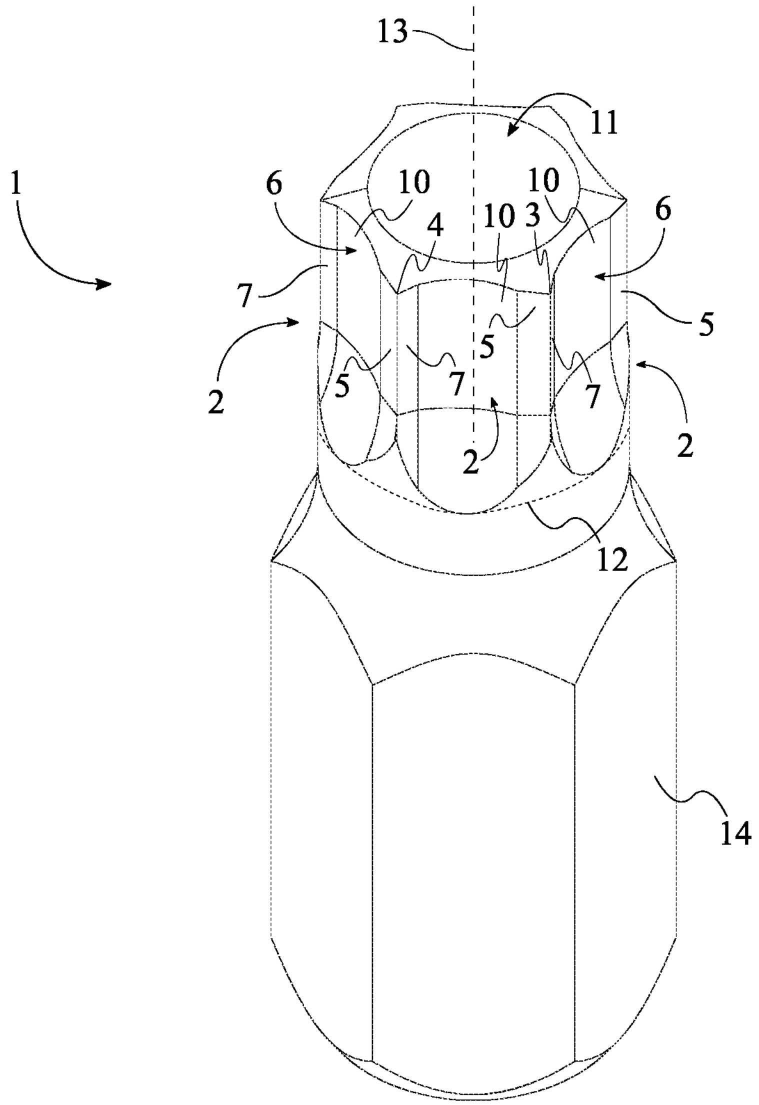
FIG. 3 is a perspective view of an alternative embodiment of the present invention.

Referring to FIG. 1 and FIG. 3, each of the plurality of laterally-bracing sidewalls 2 comprises a first lateral edge 3, a second lateral edge 4, a bracing surface 5, and an at least one engagement cavity 6. The plurality of laterally-bracing sidewalls 2 is radially positioned about a rotation axis 13 of the screw bit body 1 in order to yield a geometric profile complimentary to that of the socket fastener. The number within the plurality of laterally-bracing sidewalls 2 is subject to change to compliment the shape and profile of a variety of socket fasteners. In one embodiment of the present invention, the number within the plurality of laterally-bracing sidewalls 2 is six and the resulting geometric profile of the screw bit body 1 is a hexagon. In an alternative embodiment of the present invention, the number within the plurality of laterally-bracing sidewalls 2 is four and the resulting geometric profile of the screw bit body 1 is a square.

The bracing surface 5 physically presses against the socket fastener, in particular the lateral sidewall of a head portion from the socket fastener. The first lateral edge 3 and the second lateral edge 4 are positioned opposite to each other across the bracing surface 5. When viewed from either the top perspective or the bottom perspective, the first lateral edge 3 and the second lateral edge 4 from each of the plurality of laterally-bracing sidewalls 2 make up the corners of the screw bit body 1. The engagement cavity 6 traverses normal and into the bracing surface 5 and creates an additional gripping point/tooth on the bracing surface 5. This gripping point is created with the engagement cavity 6 and an adjacent edge, wherein the adjacent edge is either the first lateral edge 3 or the second lateral edge 4; in particular, the adjacent edge is the edge closest to the engagement cavity 6. Additionally, the engagement cavity 6 traverses into the screw bit body 1 from the first base 11 towards the second base 12. This ensures that the additional gripping point extends along the length of the screw bit body 1 for maximum grip engagement between the screw bit body 1 and the socket fastener. In one embodiment, the engagement cavity 6 also tapers from the first base 11 to the second base 12.

Figure 6:
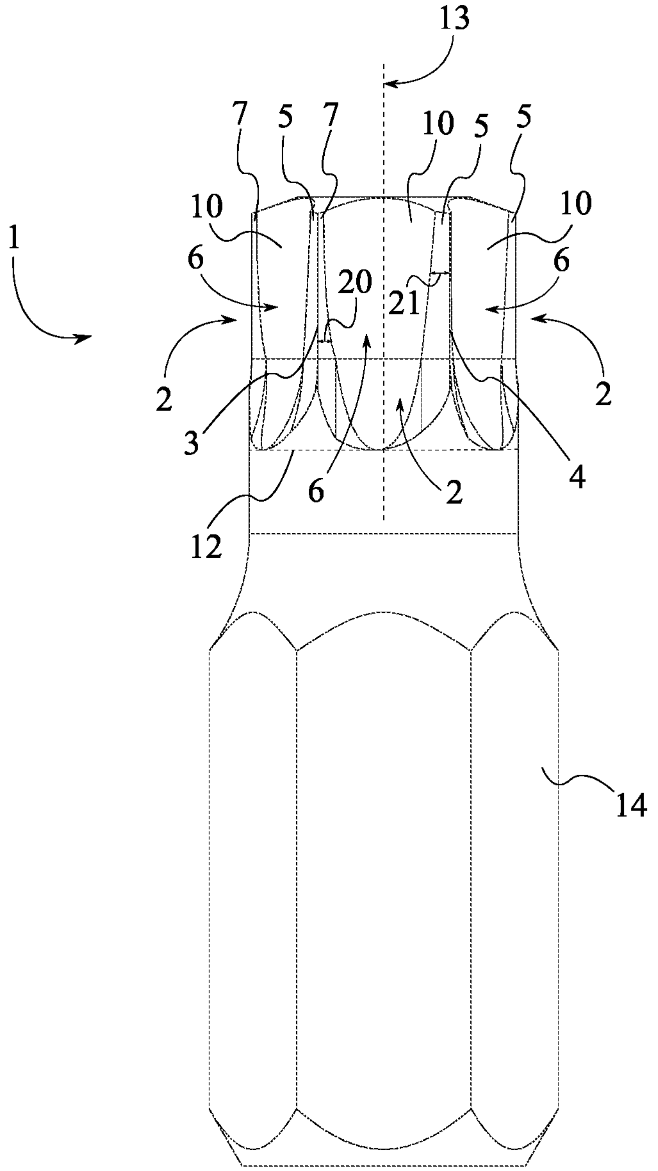
FIG. 6 is a side view of a further alternative embodiment of the present invention.
Figure 7:
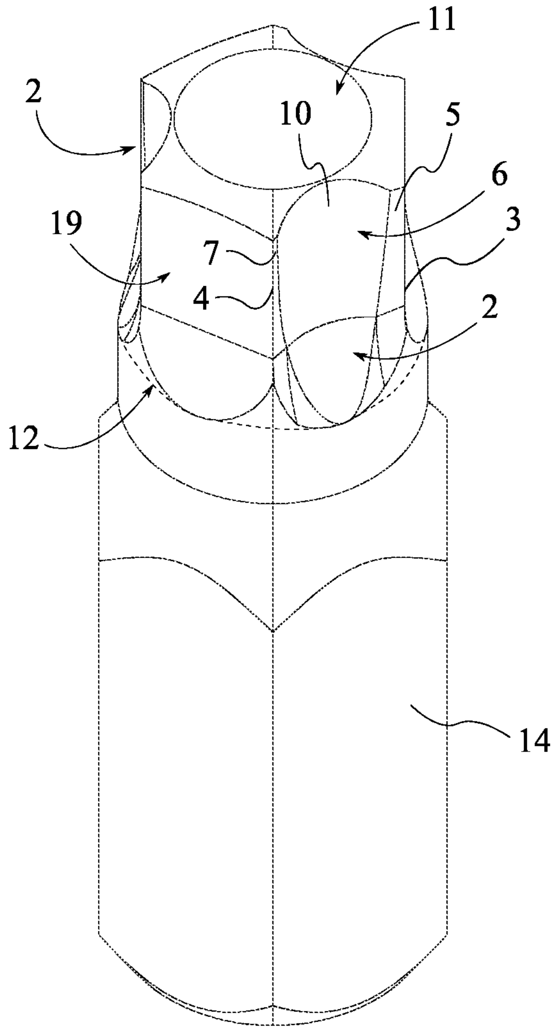
FIG. 7 is a perspective view of the embodiment of the present invention as seen in FIG. 6.
Figure 8:
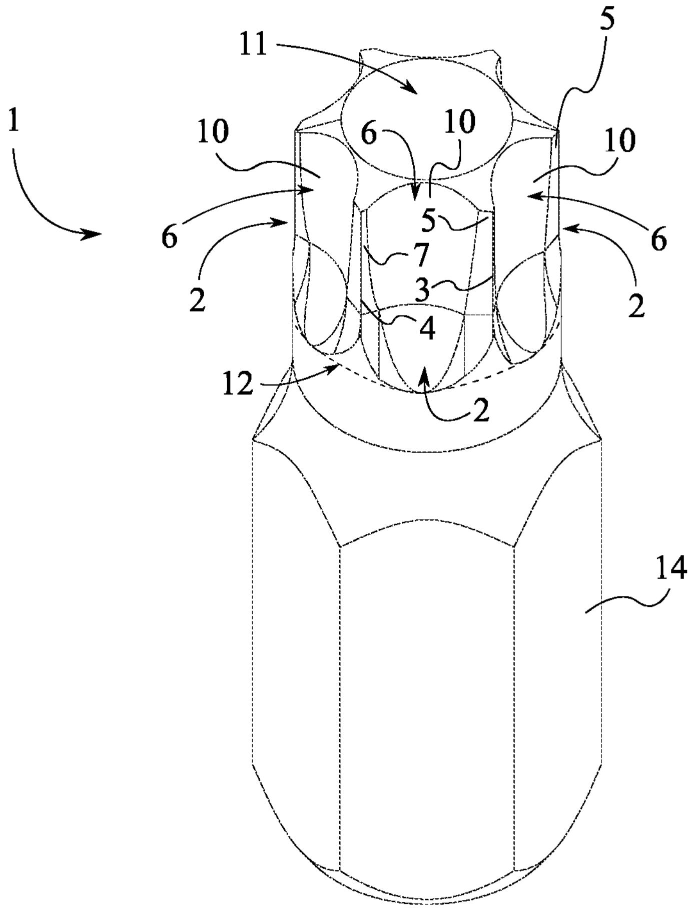
FIG. 8 is a perspective view of the embodiment of the present invention as seen in FIG. 7.

Referring to FIG. 6, the engagement cavity 6 comprises an angled driving portion 7 and a concave portion 10. The angled driving portion 7 is a straight line which, in conjunction with the adjacent edge, makes up the profile of the additional gripping tooth that makes direct contact with the internal sidewalls of the socket fastener. In the preferred embodiment of the present invention, the angled driving portion 7 is positioned adjacent to the first lateral edge 3. The additional gripping tooth digs into the internal sidewalls of the socket fastener in order to efficiently transfer torque to the socket fastener. The concave portion 10 is a semi-circular cut which provides clearance for the internal sidewalls of the socket fastener, thus ensuring that the additional gripping tooth is the only portion of the screw bit body 1 which presses against and engages the socket fastener. For this, the concave portion 10 is positioned adjacent to the angled driving portion 7, opposite to the first lateral edge 3. Alternative profiles may be used for the concave portion 10 including, but not limited to, a semi-square profile, a semi-rectangular profile, a semi-oval profile, or a combination of a circular shape connected to a straight portion or portions. For example, the concave portion 10 may be made up of a plurality of linear segments 101 or any combination of at least one semi-circular segment 102 and at least one linear segment 103 to create the overall concave portion 10 as shown in example FIG. 10-13. In such embodiments, each of the plurality of linear segments 101 or the at least one semi-circular segment 102 and at least one linear segment 103 may be connected to one another at angles of less than 180 degrees in order to form the concave portion 10. In the preferred embodiment, as seen in FIG. 6, a first end 8 of the angled driving portion 7 is positioned coincident with the first lateral edge 3 to yield a sharp corner. Furthermore, a second end 9 of the angled driving portion 7 is positioned adjacent to the concave portion 10. The portion between the bracing surface 5 and the concave portion 10 acts as a pivot point which defines when the additional gripping tooth engages the socket fastener. When the internal sidewalls slide past the junction in between the concave portion 10 and the bracing surface 5, that is when the angled driving portion 7 is engaged and pressed against the internal sidewalls of the socket fastener.

The angled driving portion 7 and the bracing surface 5 may be orientated at an obtuse angle to each other. A length of the angled driving portion 7 from the second end 9 towards the first end 8 and a length of the concave portion 10 from the second end 9 towards the bracing surface 5 makes no contact with the fastener. The meeting point between the concave portion 10 and the bracing surface 5 is a pivot point when torque is applied to the bit, increasing the engagement feature bite into the fastener sidewall.

The preferred proration between the concave portion 10 and the bracing surface 5 and the angled driving portion 7 is undetermined, yet also may be at a ratio of 5 for bracing surface 5, 2.5 for concave portion 10 and 2.5 for angled driving portion 7. In another proration the ratio is 6 for bracing surface 5, 2 for concave portion 10 and 2 for angled driving portion 7.

In other embodiments, as illustrated in FIG. 5-8 a driving width distance 20 of the angled driving portion 7 and/or a bracing width distance 21 of the bracing surface 5, perpendicular to the rotation axis 13 may be tapered from the second base 12 towards the first base 11. In other words, a first driving width distance of the angled driving portion 7 perpendicular the rotation axis 13 and adjacent to the first base 11 is less than a second driving width distance of the angled driving portion 7 perpendicular the rotation axis 13 and adjacent to the second base 12 and/or a first bracing width distance of the bracing surface 5 perpendicular the rotation axis 13 and adjacent to the first base 11 is less than a second bracing width distance of the bracing surface 5 perpendicular the rotation axis 13 and adjacent to the second base 12.

The present invention offers the ability to be used as a normal bit and a bit which provides additional gripping force. When the present invention is rotated with the additional gripping teeth engaging the socket fastener, slippage is prevented. Alternatively, when the present invention is rotated in the opposite direction, the bracing surface 5 provides enough grip to rotate the socket fastener. Resultantly, the present invention is a multi-directional driver bit.

Referring to FIGS. 1, 2, 5, and 7, the present invention may also further comprise a plurality of intermittent sidewalls 19. Each of the plurality of intermittent sidewalls 19 is a flat surface which engages the socket fastener like a traditional screw bit design. The plurality of intermittent sidewalls 19 is radially positioned about the rotation axis 13 of the screw bit body 1. Additionally, the plurality of intermittent sidewalls 19 is interspersed amongst the plurality of laterally-bracing sidewalls 2. Resultantly, the plurality of intermittent sidewalls 19 and the plurality of laterally-bracing sidewalls 2 radially alternate between each other about the rotation axis 13 of the screw bit body 1.

The present invention also incorporates an attachment feature which allows an external torque tool to attach to the screw bit body 1 and transfer torque force onto the socket fastener through the screw bit body 1. Referring to FIG. 1, the present invention comprises an attachment body 14. The attachment body 14 is centrally positioned around and along the rotation axis 13 such that the rotation axis 13 of the attachment body 14 and the rotation axis 13 of the screw bit body 1 are coincidentally aligned. Additionally, the attachment body 14 is connected adjacent to the second base 12. The attachment body 14 preferably has a hexagonal cross-section in order to fit within a female attachment member of the external torque tool. External torque tools include, but are not limited to, electric drills, torque wrenches, pneumatic drills, socket screw drivers, and other similar torque tools.

Figure 9:
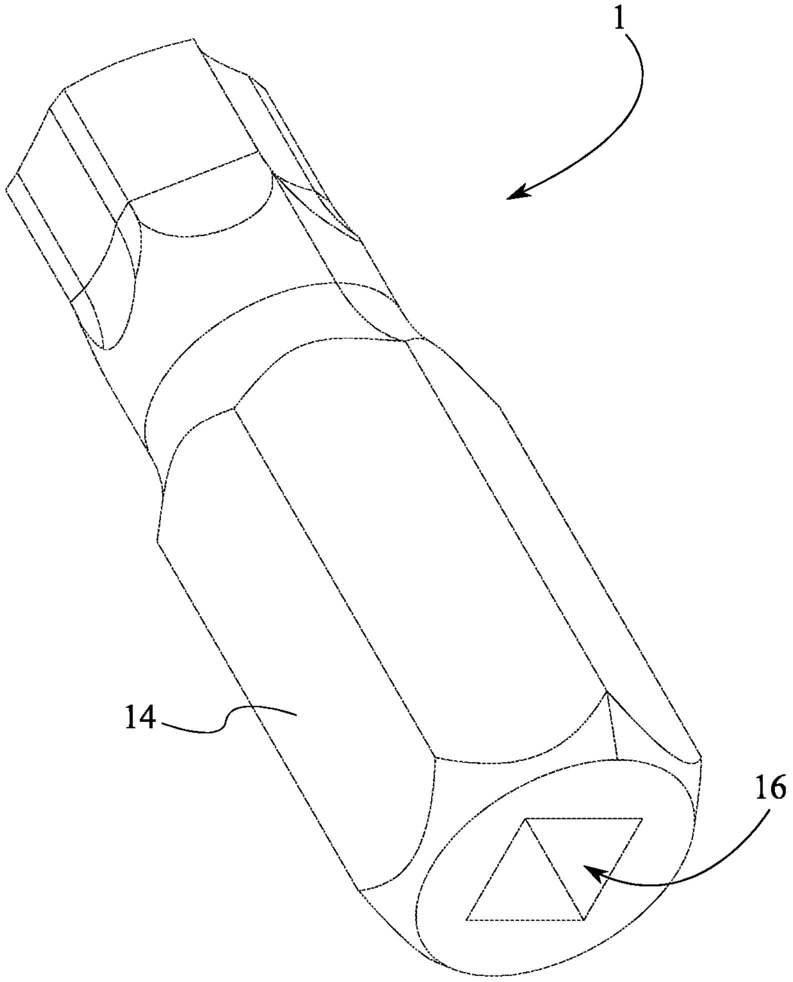
FIG. 9 is a perspective view of the present invention showing the engagement bore.
Figure 10:
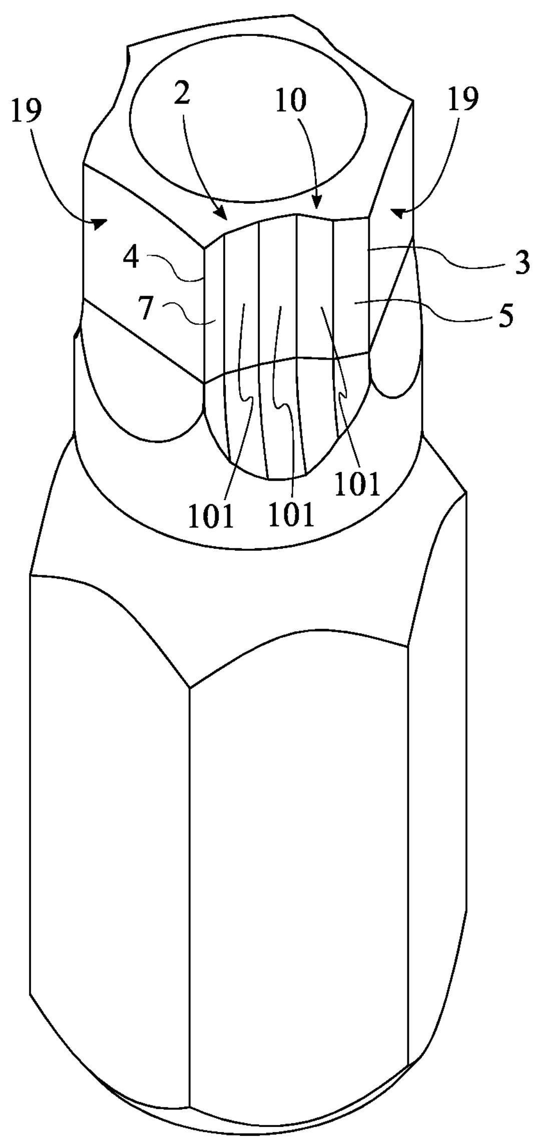
FIG. 10 is a perspective view of an alternative embodiment of the present invention.
Figure 11:
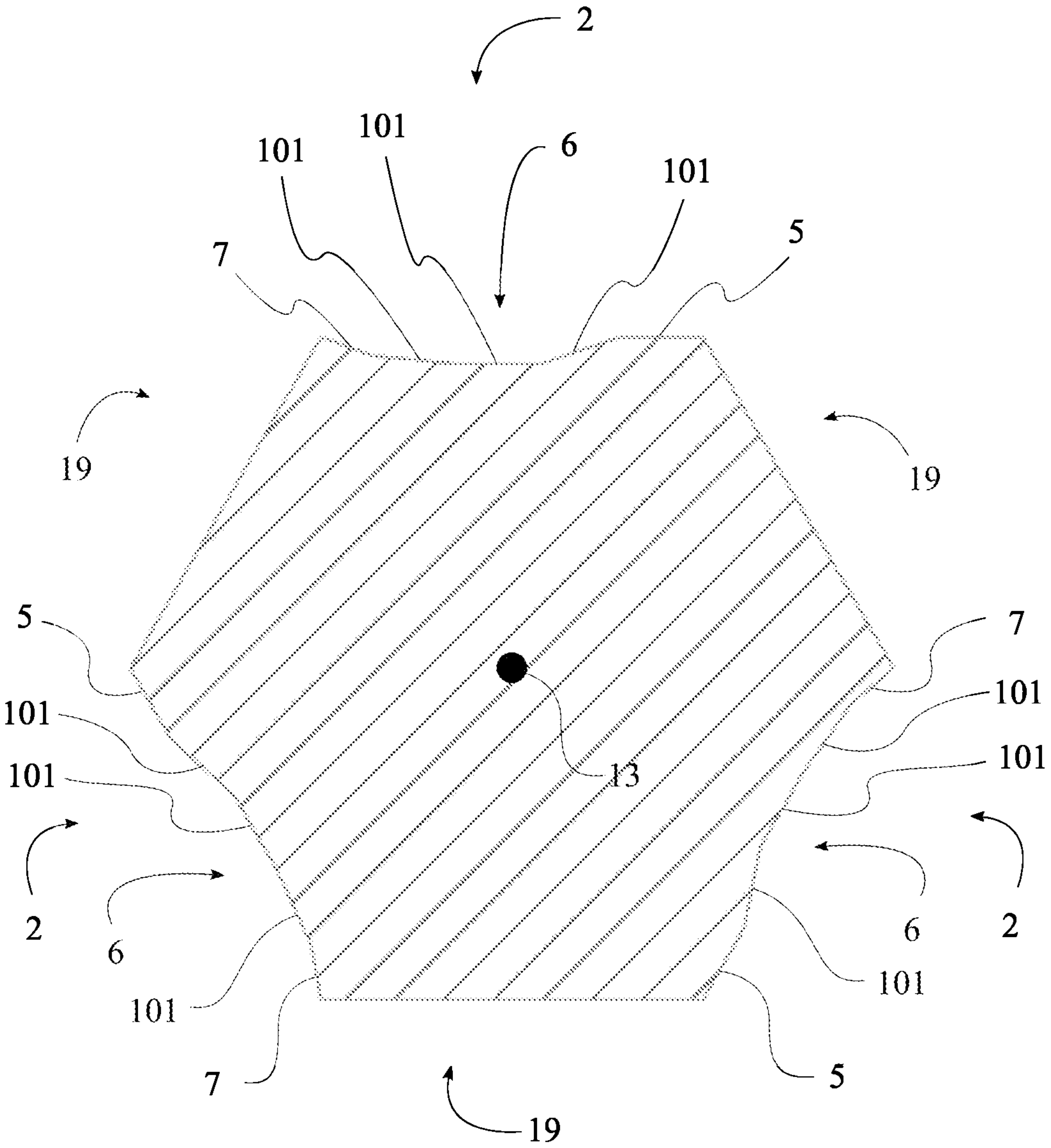
FIG. 11 is a perspective view of the embodiment of the present invention as seen in FIG. 10.
Figure 12:
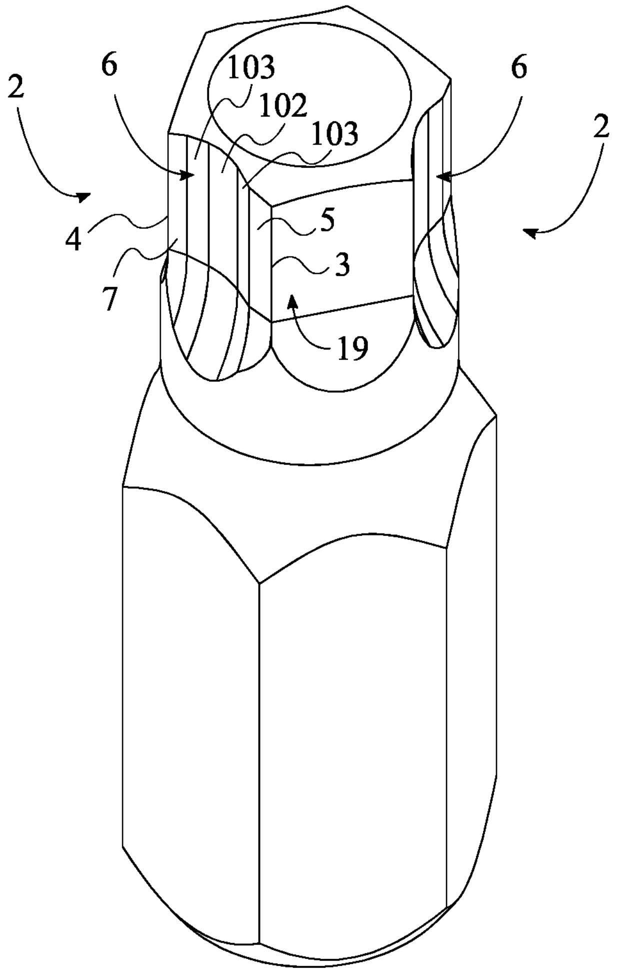
FIG. 12 is a perspective view of an alternative embodiment of the present invention.
Figure 13:
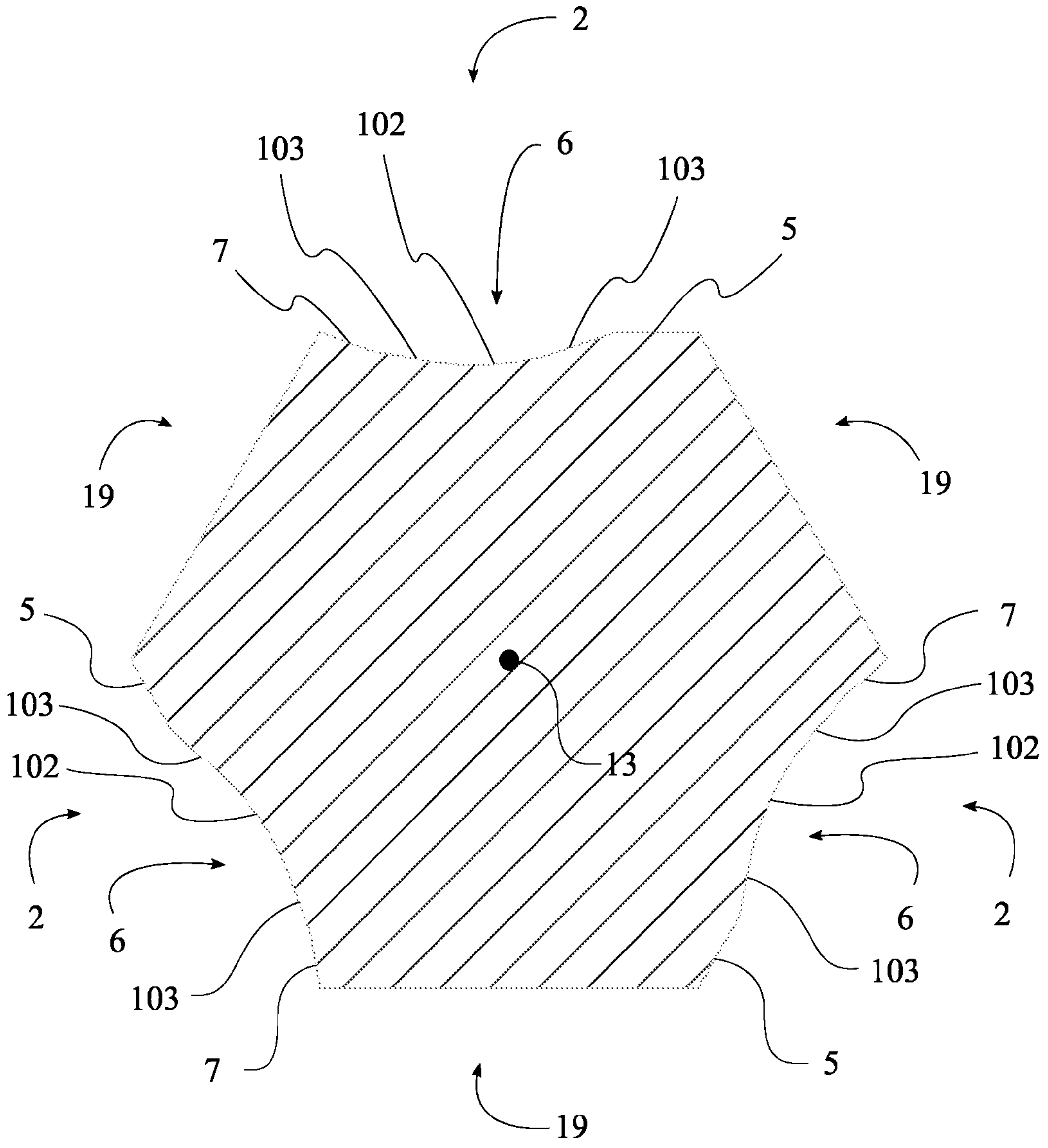
FIG. 13 is a perspective view of the embodiment of the present invention as seen in FIG. 12.

In another embodiment, referring to FIG. 9, the present invention further comprises an engagement bore 16. The engagement bore 16 allows the present invention to be attached to a male attachment member of an external torque tool, such as a socket wrench or a screw driver. The engagement bore 16 traverses into the attachment body 14 along the rotation axis 13, opposite the screw bit body 1. The engagement bore 16 is shaped to receive a male attachment member of a socket wrench; the preferred shape is square as the majority of socket wrenches utilize a square attachment member. In this embodiment, the preferred attachment body 14 is cylindrical shaped. In alternative embodiments, the shape and design of the engagement bore 16, and the attachment body 14 may vary to be adaptable to different torque tool designs and different attachment means.

Figure 4:
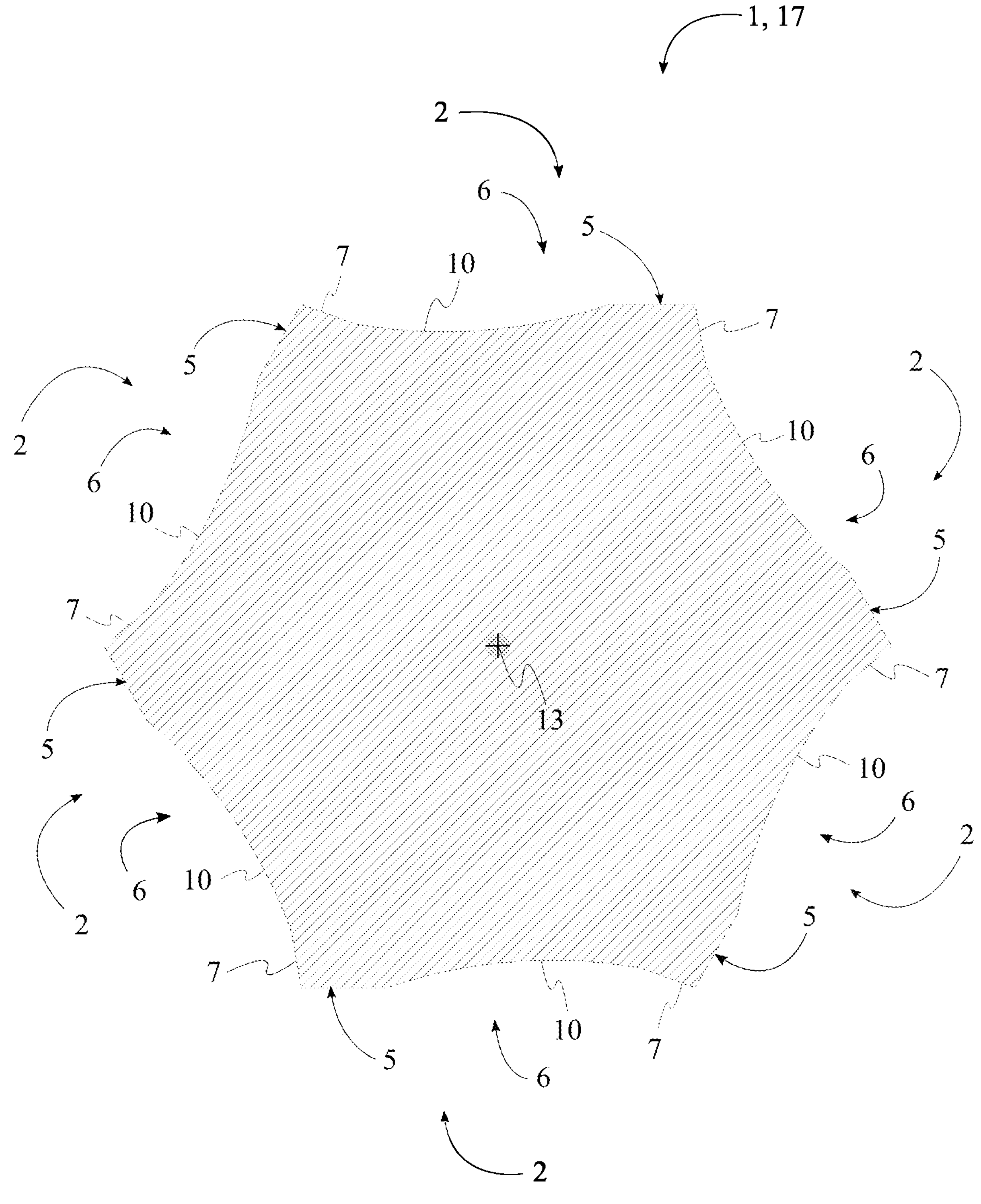
FIG. 4 is a cross-sectional view of the invention as presented in FIG. 2.
Figure 5:
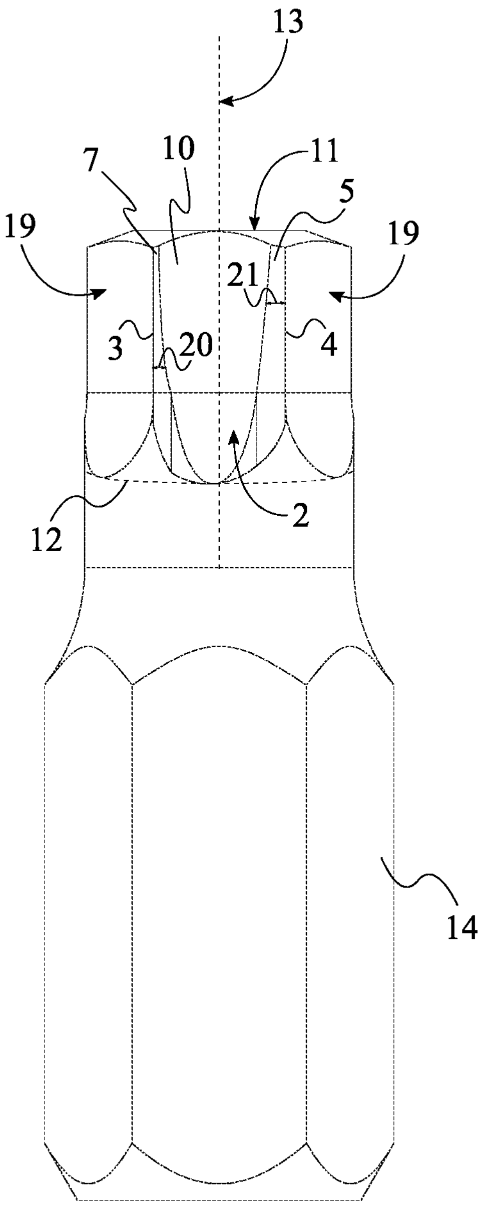
FIG. 5 is a side view of a further alternative embodiment of the present invention.

In one embodiment, the present invention is implemented as a dual-sided screw bit, thus providing both a clockwise and a counter-clockwise screw bit body 1 simultaneously. In this embodiment, the at least one screw bit body 1 comprises a first screw bit body 17 and a second screw bit body 18. The attachment body 14 preferably has a hexagonal cross-section. The attachment body 14 is centrally positioned around and along the rotation axis 13 of the first screw bit body 17 such that the rotation axis 13 of the attachment body 14 and the rotation axis 13 of the first screw bit body 17 are coincidentally aligned. Additionally, the attachment body 14 is connected adjacent to the second base 12 of the first screw bit body 17. The second screw bit body 18 shares the attachment body 14 with the first screw bit body 17. Thus, the second screw bit body 18 is concentrically positioned with the first screw bit body 17. Additionally, the second screw bit body 18 is positioned adjacent to the attachment body 14, opposite the first screw bit body 17, similar to traditional double-sided screw bit designs. Similar to the first screw bit body 17, the attachment body 14 is connected to the second base 12 of the second screw bit body 18. This embodiment yields the screw bit body 1 on either side of the attachment body 14. Referring to FIG. 4, the first screw bit body 17 is designed to screw in a socket fastener, the clockwise version. The second screw bit body 18 is designed to unscrew the socket fastener, the counter-clockwise version. For this, the first screw bit body 17 and the second screw bit body 18 are mirror images of each other about a central sagittal plane 15 of the attachment body 14. The central sagittal plane 15 divides the attachment body 14 into two identical segments, along the length of the attachment body 14. Resultantly, the additional gripping tooth of the first screw bit body 17 engages when the first screw bit body 17 is rotated clockwise within the socket fastener. Similarly, the additional gripping tooth of the second screw bit body 18 engages when the second screw bit body 18 is rotated counter-clockwise within the socket fastener.

In an alternative embodiment of the present invention, the screw bit body 1 is tapered from the second base 12 to the first base 11 forming a shaper end, similar to traditional screwdriver heads. In an alternative embodiment, the present invention is implemented as a ball-end screw bit. In this embodiment, the bracing surface 5 of each of the plurality of laterally-bracing sidewalls 2 comprises a concave surface and a convex surface. The convex surface is positioned adjacent to the first base 11 such that the convex surface from each of the plurality of laterally-bracing sidewalls 2 forms a ball-like shape. The concave surface is positioned adjacent to the convex surface, opposite to the first base 11 such that the convex surface from each of the plurality of laterally-bracing sidewalls 2 further forms the ball-like shape and provides clearance for when the screw bit body 1 is engaged to the socket fastener at an angle. The convex surface and the concave surface are oriented along the rotation axis 13 of the screw bit body 1 to position the ball-like shape terminally on the screw bit body 1. It is preferred that the curvature, length, and height of the concave surface and the convex surface is identical. As a result, the screw bit body 1 overall has a ball-like shape. This allows the user to engage the socket fastener at an angle, an especially useful feature for fasteners located in hard-to-reach areas.

In yet another embodiment of the present invention, the at least one engagement cavity 6 comprises a first cavity and a second cavity. The first cavity and the second cavity are positioned opposite to each other across the bracing surface 5. Additionally, the first cavity and the second cavity are oriented towards each other, thus creating two additional gripping points on each of the plurality of laterally-bracing sidewalls 2. Resultantly, the screw bit body 1 engages the socket fastener regardless of the rotation.

Although the invention has been explained in relation to its preferred embodiment, it is to be understood that many other possible modifications and variations can be made without departing from the spirit and scope of the invention as hereinafter claimed.

What is claimed is:

1. A multi-directional driver bit comprising:

at least one screw bit body;

the screw bit body comprising a plurality of laterally-bracing sidewalls, a plurality of intermittent sidewalls, a first base and a second base;

each of the plurality of laterally-bracing sidewalls comprising a first lateral edge, a second lateral edge, a bracing surface and an engagement cavity, the first lateral edge and the second lateral edge being positioned opposite to each other across the bracing surface, the engagement cavity traversing normal and into the bracing surface, the engagement cavity traversing into the at least one screw bit body from the first base towards the second base, the engagement cavity comprising an angled driving portion and a concave portion, the angled driving portion being positioned adjacent to the first lateral edge, the angled driving portion being positioned in between the first lateral edge and the concave portion, a first end of the angled driving portion being positioned coincident with the first lateral edge, a second end of the angled driving portion being positioned adjacent to the concave portion, the bracing surface being flat, the angled driving portion being flat;

the bracing surface being colinear with the first lateral edge and the second lateral edge;

the angled driving portion being not coplanar with the bracing surface for each of the plurality of laterally-bracing sidewalls;

the plurality of laterally-bracing sidewalls being radially positioned about a rotation axis of the at least one screw bit body;

the plurality of intermittent sidewalls being radially positioned about the rotation axis of the at least one screw bit body;

the plurality of intermittent sidewalls being flat;

the plurality of intermittent sidewalls being interspersed among the plurality of laterally-bracing sidewalls; and the bracing surface of an arbitrary laterally-bracing sidewall among the plurality of laterally-bracing sidewalls being angularly offset from an adjacent intermittent sidewall among the plurality of intermittent sidewalls by an obtuse angle so as to create a gripping tooth.

2. The multi-directional driver bit as claimed in claim 1 comprises:

an attachment body;

an engagement bore;

the attachment body being centrally positioned around and along the rotation axis;

the attachment body being connected adjacent to the second base; and the engagement bore traversing into the attachment body along the rotation axis, opposite the screw bit body.

3. The multi-directional driver bit as claimed in claim 1 comprises:

an attachment body;

the attachment body being centrally positioned around and along the rotation axis; and the attachment body being connected adjacent to the second base.

4. The multi-directional driver bit as claimed in claim 1, wherein the plurality of intermittent sidewalls and the plurality of laterally-bracing sidewalls radially alternate between each other about the rotation axis of the screw bit body.

5. The multi-directional driver bit as claimed in claim 1, wherein the first lateral edge, the second lateral edge, and the bracing surface taper from the first base to the second base.

6. The multi-directional driver bit as claimed in claim 1, wherein the engagement cavity tapers from the first base to the second base.

7. The multi-directional driver bit as claimed in claim 1, wherein a driving width distance of the angled driving portion perpendicular to the rotation axis is tapered from the from the second base to the first base.

8. The multi-directional driver bit as claimed in claim 1, wherein a bracing width distance of the bracing surface perpendicular to the rotation axis is tapered from the from the second base to the first base.

9. The multi-directional driver bit as claimed in claim 1, further comprising:

the concave portion comprising a plurality of planar portions; and each of the plurality of planar portions being connected to one another at angles less than 180 degrees.

10. The multi-directional driver bit as claimed in claim 1, further comprising:

the concave portion comprising at least one curved portion and at least one planar portion; and each of the at least one curved portion and the at least one planar portion being connected to one another at angles less than 180 degrees.

* * * * *